United States Patent
Park et al.

(10) Patent No.: US 9,838,511 B2
(45) Date of Patent: Dec. 5, 2017

(54) METHODS AND ARRANGEMENTS FOR TRAFFIC INDICATION MAPPING IN WIRELESS NETWORKS

(75) Inventors: Minyoung Park, Portland, OR (US); Thomas J. Kenney, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 13/977,703

(22) PCT Filed: Dec. 31, 2011

(86) PCT No.: PCT/US2011/068258
§ 371 (c)(1),
(2), (4) Date: Mar. 19, 2014

(87) PCT Pub. No.: WO2013/052076
PCT Pub. Date: Apr. 11, 2013

(65) Prior Publication Data
US 2014/0204960 A1    Jul. 24, 2014

Related U.S. Application Data

(60) Provisional application No. 61/544,883, filed on Oct. 7, 2011.

(51) Int. Cl.
*H04J 3/24* (2006.01)
*H04L 29/06* (2006.01)
(Continued)

(52) U.S. Cl.
CPC ......... *H04L 69/22* (2013.01); *H04L 12/4633* (2013.01); *H04W 28/06* (2013.01); *H04W 80/02* (2013.01)

(58) Field of Classification Search
CPC ........ H04L 69/22; H04W 28/06; H04W 80/02
(Continued)

(56) References Cited

U.S. PATENT DOCUMENTS

2007/0258356 A1    11/2007 Joung et al.
2009/0006792 A1    1/2009 Federwisch et al.
(Continued)

FOREIGN PATENT DOCUMENTS

WO    2013/052076 A1    4/2013

OTHER PUBLICATIONS

International Preliminary Report on Patentability and Written Opinion received for PCT Patent Application No. PCT/US2011/068258 dated on Apr. 17, 2014, 8 Pages.
(Continued)

*Primary Examiner* — Sai-Ming Chan
(74) *Attorney, Agent, or Firm* — Patent Capital Group (57) ABSTRACT

Embodiments may implement a new hierarchical data structure for traffic indication mapping to facilitate transmissions for wireless communications devices. Many embodiments comprise MAC sublayer logic to generate and transmit management frames such as beacon frames with a partial virtual bitmap based upon the hierarchical data structure for traffic indication mapping. In some embodiments, the MAC sublayer logic may store the traffic indication map and/or the traffic indication map structure in memory, in logic, or in another manner that facilitates transmission of the frames. Some embodiments may receive, detect, and decode communications with frames comprising the partial virtual bitmap based upon the hierarchical data structure. In some embodiments, indications of buffered data for pages, superblocks, blocks, sub-blocks, and/or stations may be inverted. In several embodiments, a new association identifier (AID) structure is defined for the new hierarchical data structure for traffic indication mapping.

25 Claims, 8 Drawing Sheets

(51) Int. Cl.
*H04L 12/46* (2006.01)
*H04W 28/06* (2009.01)
*H04W 80/02* (2009.01)

(58) Field of Classification Search
USPC ........................................................ 370/474
See application file for complete search history.

(56) References Cited

U.S. PATENT DOCUMENTS

| | | |
|---|---|---|
| 2009/0016306 A1 | 1/2009 | Wang et al. |
| 2010/0110962 A1 | 5/2010 | Igarashi et al. |
| 2010/0142426 A1 | 6/2010 | Taniuchi et al. |
| 2010/0189021 A1 | 7/2010 | He et al. |
| 2010/0265864 A1* | 10/2010 | He et al. ........................ 370/311 |
| 2012/0063335 A1* | 3/2012 | Cho et al. ...................... 370/252 |
| 2013/0148575 A1 | 6/2013 | Wentink et al. |
| 2013/0229959 A1 | 9/2013 | Ghosh et al. |
| 2013/0294261 A1 | 11/2013 | Ghosh et al. |
| 2014/0146678 A1 | 5/2014 | Merlin et al. |
| 2017/0222894 A1 | 8/2017 | Park et al. |

OTHER PUBLICATIONS

International Search Report and Written Opinion received for PCT Patent Application No. PCT/US2011/068258, dated on Oct. 31, 2012, 10 Pages.

USPTO Non-Final Office Action issued in U.S. Appl. No. 15/432,323 dated Jul. 28, 2017; 12 pages.

* cited by examiner

METHODS AND ARRANGEMENTS FOR TRAFFIC INDICATION MAPPING IN WIRELESS NETWORKS

BACKGROUND

Embodiments are in the field of wireless communications. More particularly, embodiments are in the field of communications protocols between wireless transmitters and receivers.

DETAILED DESCRIPTION OF EMBODIMENTS

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

References to "one embodiment," "an embodiment," "example embodiment," "various embodiments," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Embodiments may implement a new hierarchical data structure for traffic indication mapping to facilitate transmissions for wireless communications devices. Many embodiments comprise MAC sublayer logic to generate and transmit management frames such as beacon frames with a partial virtual bitmap based upon the hierarchical data structure for traffic indication mapping. In some embodiments, the MAC sublayer logic may store the traffic indication map and/or the traffic indication map structure in memory, in logic, or in another manner that facilitates transmission of the frames. Some embodiments may receive, detect, and decode communications with frames comprising the partial virtual bitmap based upon the hierarchical data structure.

In many embodiments, the new hierarchical data structure for traffic indication mapping may describe stations assigned to a sub-block, more than one sub-blocks of stations assigned to a blocks, more than one blocks of stations assigned to a super-block, and more than one super-blocks of stations assigned to a page of more than one pages of stations. In one embodiment, the new hierarchical data structure for traffic indication mapping comprises four pages to facilitate mapping for up to 2048 stations per page. In such embodiments, each page may comprise four super-blocks with unique subsets of the stations assigned to the page, each super-block may comprise eight blocks of unique subsets of the stations assigned to the super-block, each block may comprise eight sub-blocks of unique subsets of the stations assigned to the block, and each sub-block may comprise a unique subset of eight stations. Furthermore, the partial virtual bitmaps that refer to such structures may identify the association identifiers for stations for which data is being buffered by an access point (AP) by identifying the corresponding page(s), super-block(s), block(s), and sub-blocks within which the stations reside. In many embodiments, the AP may determine and transmit such an association identifier to each station as the stations are associated with the AP.

In many embodiments, the AP may compress and/or reduce the amount of data in the partial virtual bitmap of the traffic indication map (TIM) element. In some embodiments, the amount of data may be reduce/compressed by referencing the blocks and/or sub-blocks in bitmaps and including or excluding the blocks and/or sub-blocks within the partial virtual bitmap based upon the content of the blocks and/or sub-blocks. In some embodiments, the amount of data may be reduce/compressed by limiting the range of blocks within the partial virtual bitmap based upon the page to which the blocks are assigned and/or the block indexes.

In some embodiments, indications of buffered data for pages, super-blocks, blocks, sub-blocks, and/or stations may be inverted. In many embodiments, inverting such indications may compress the data transmitted in the TIM element. For instance, if the number of blocks that comprise all logical ones exceeds the number of blocks with all logical zeros, less data may be transmitted in the TIM element to describe the stations with all logical zeros. Thus, the indications of buffered data for the stations may be inverted by, e.g., inverting a bit in the block control field, allowing stations described in the TIM element to indicate that such stations do not have buffered data instead of including, in the TIM element, stations that do have buffered data.

In several embodiments, a new association identifier (AID) structure is defined for the new hierarchical data structure for traffic indication mapping. In many embodiments, the new AID structure comprises bits identifying a page, bits identifying a super-block, bits identifying a block, bits identifying a sub-block, and bits identifying a station within the particular sub-block. A station associated with an AP may parse the association identifier to determine the page, super-block, block, sub-block, and bit position within that sub-block of a TIM element that identifies whether the AP is buffering data for the station.

Some embodiments implement Institute of Electrical and Electronic Engineers (IEEE) 802.11 systems such as IEEE 802.11ah systems and other systems that operate in accordance with standards such as the IEEE 802.11-2007, IEEE Standard for Information technology—Telecommunications and information exchange between systems—Local and metropolitan area networks—Specific requirements—Part 11: Wireless LAN Medium Access Control (MAC) and Physical Layer (PHY) Specifications (http://standards.ieee.org/getieee802/download/802.11-2007.pdf).

According to one embodiment, the partial virtual bitmap based upon the hierarchical data structure for traffic indication mapping is defined to enable a greater number of associated stations and to utilize a more efficient TIM element and, in many instances, smaller TIM element for low-power consumption stations such as small battery-powered wireless devices (e.g., sensors) to use Wi-Fi to connect to the Internet with very low power consumption. Supporting such a large number of stations becomes challenging especially when those associated stations are in a power save (PS) mode because a much larger TIM element may have to be transmitted to describe, in a partial virtual map, all stations between the block with the lowest station AID for which data is buffered to the block with the highest station AID. Since IEEE 802.11ah is expected to have a physical layer (PHY) data rate of 1/10 or lower compared to 802.11n PHY data rates, the overhead of TIM element transmission becomes much larger in terms of channel occupancy.

Several embodiments comprise access points (APs) for and/or client devices of APs or stations (STAs) such as routers, switches, servers, workstations, netbooks, mobile devices (Laptop, Smart Phone, Tablet, and the like), as well as sensors, meters, controls, instruments, monitors, appliances, and the like. Some embodiments may provide, e.g., indoor and/or outdoor "smart" grid and sensor services. For example, some embodiments may provide a metering station to collect data from sensors that meter the usage of electricity, water, gas, and/or other utilities for a home or homes within a particular area and wirelessly transmit the usage of these services to a meter substation. Further embodiments may collect data from sensors for home healthcare, clinics, or hospitals for monitoring healthcare related events and vital signs for patients such as fall detection, pill bottle monitoring, weight monitoring, sleep apnea, blood sugar levels, heart rhythms, and the like. Embodiments designed for such services may generally require much lower data rates and much lower (ultra low) power consumption than devices provided in IEEE 802.11n/ac systems.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may comprise low power wireless communications like Bluetooth®, wireless local area networks (WLANs), wireless metropolitan area networks (WMANs), wireless personal area networks (WPAN), cellular networks, communications in networks, messaging systems, and smart-devices to facilitate interaction between such devices. Furthermore, some wireless embodiments may incorporate a single antenna while other embodiments may employ multiple antennas. For instance, multiple-input and multiple-output (MIMO) is the use of radio channels carrying signals via multiple antennas at both the transmitter and receiver to improve communication performance.

While some of the specific embodiments described below will reference the embodiments with specific configurations, those of skill in the art will realize that embodiments of the present disclosure may advantageously be implemented with other configurations with similar issues or problems.

Figure 1:
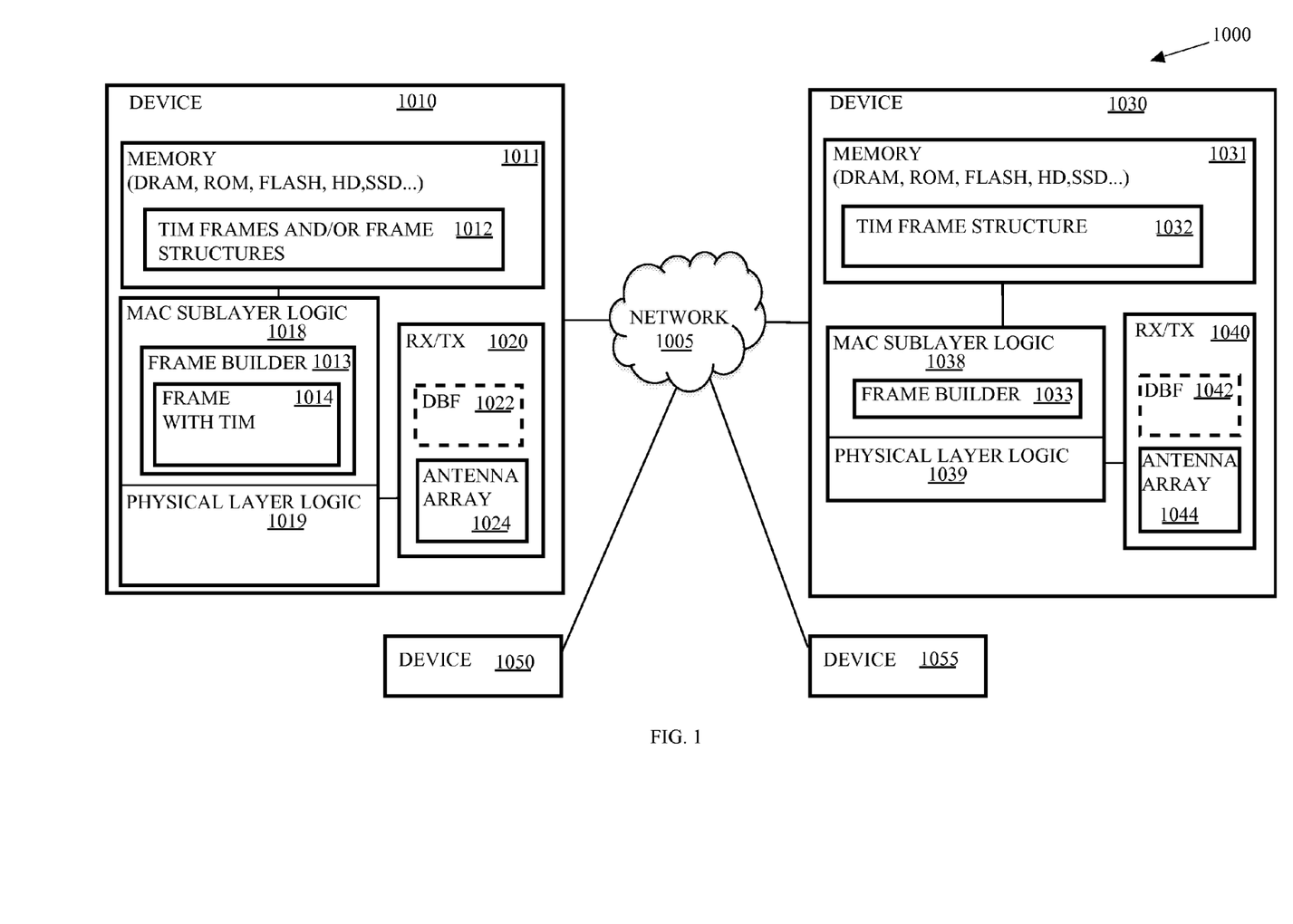
FIG. 1 depicts an embodiment of a wireless network comprising a plurality of communications devices, including multiple fixed or mobile communications devices.

Turning now to FIG. 1, there is shown an embodiment of a wireless communication system 1000. The wireless communication system 1000 comprises a communications device 1010 that may be wire line and wirelessly connected to a network 1005. The communications device 1010 may communicate wirelessly with a plurality of communication devices 1030, 1050, and 1055 via the network 1005. The communications device 1010 may comprise an access point. The communications device 1030 may comprise a low power communications device such as a sensor, a consumer electronics device, a personal mobile device, or the like. And communications devices 1050 and 1055 may comprise sensors, stations, access points, hubs, switches, routers, computers, laptops, netbooks, cellular phones, smart phones, PDAs (Personal Digital Assistants), or other wireless-capable devices. Thus, communications devices may be mobile or fixed. For example, the communications device 1010 may comprise a metering substation for water consumption within a neighborhood of homes. Each of the homes within the neighborhood may comprise a sensor such as the communications device 1030 and the communications device 1030 may be integrated with or coupled to a water usage meter.

Initially, the communications device 1030 may associate with the communications device 1010 and receive an association identifier (AID) from the communications device 1010 to uniquely identify the communications device 1030 with respect to other communications devices associated with the communications device 1010. In many embodiments, the AID may comprise 13 bits, wherein the bits identify the page, super-block, block, sub-block, and a bit position for the station within the sub-block. FIG. 1B depicts an embodiment of such an AID structure 1150. Thereafter, the communications device 1010 may buffer data such as medium access control (MAC) service data units (MSDUs) for the communications device 1030.

After buffering an MSDU for the communications device 1030, the communications device 1010 may transmit a beacon to associated devices, identifying the devices with data buffered by the communications device 1010 by means of a traffic indication map (TIM) element such as the frame 1014. In the present embodiment, the TIM element may identify the AID of each station that has data buffered such as the communications device 1030 by identifying the page, super-block, block, and sub-block of the stations. The TIM element may also comprise a number of bits such as eight bits that identify the stations in the sub-block that have buffered data via logical ones and zeroes. In many embodiments, a logical one at the bit location in the sub-block associated with the communications device 1030 may indicate that the communications device 1010 is buffering data for the communications device 1030. In further embodiments, a logical zero may represent that the communications device 1010 is buffering data for the communications device 1030.

The communications device 1030 may interpret the TIM element based upon the association identifier assigned to the communications device 1030 by the communications device 1010. In many embodiments, the communications device 1030 may parse the association identifier to determine a page associated with communications device 1030 and may parse the TIM element to determine if the TIM element describes data buffering for stations associated with the same page. If so, the communications device 1030 may repeat the process of parsing the association identifier and comparing the values of the super-block, block, and sub-block with those represented by the TIM element to determine whether the TIM element indicates that the communications device 1010 is buffering data for the communications device 1030 and/or whether the TIM element includes data at the bit position in the sub-block associated with the communications device 1030 that indicates that the communications device 1010 is buffering data for the communications device 1030.

In further embodiments, the communications device 1010 may facilitate data offloading. For example, communications devices that are low power sensors may include a data offloading scheme to, e.g., communicate via Wi-Fi, another communications device, a cellular network, or the like for the purposes of reducing power consumption consumed in waiting for access to, e.g., a metering station and/or increasing availability of bandwidth. Communications devices that receive data from sensors such as metering stations may include a data offloading scheme to, e.g., communicate via Wi-Fi, another communications device, a cellular network, or the like for the purposes of reducing congestion of the network 1005.

The network 1005 may represent an interconnection of a number of networks. For instance, the network 1005 may couple with a wide area network such as the Internet or an intranet and may interconnect local devices wired or wirelessly interconnected via one or more hubs, routers, or switches. In the present embodiment, network 1005 communicatively couples communications devices 1010, 1030, 1050, and 1055.

The communication devices 1010 and 1030 comprise memory 1011 and 1031, medium access control (MAC) sublayer logic 1018 and 1038, and physical layer (PHY) logic 1019 and 1039, respectively. The memory 1011 and 1031 may comprise a storage medium such as dynamic random access memory (DRAM), read only memory (ROM), buffers, registers, cache, flash memory, hard disk drives, solid-state drives, or the like. The memory 1011 and 1031 may store frames and/or frame structures, or portions thereof such as a management frame structure and a traffic indication map (TIM) element based upon a hierarchical data structure such as the hierarchical data structure 1100 illustrated in FIG. 1A. Furthermore, the memory 1011 and 1031 may comprise a traffic indication map in a hierarchical data structure that identifies the associated stations for which data is buffered. For example, the memory 1011 may comprise an indication that the communications device 1010 comprises buffered data as well as a reference or link to the buffered data for the communications device 1030.

The MAC sublayer logic 1018, 1038 may comprise logic to implement functionality of the MAC sublayer of the data link layer of the communications device 1010, 1030. The MAC sublayer logic 1018, 1038 may generate the frames such as management frames and the physical layer logic 1019, 1039 may generate physical layer protocol data units (PPDUs) based upon the frames. For example, the frame builder 1013 may generate frames with a TIM element 1014 and the data unit builder of the physical layer logic 1019 may encapsulate the frames with preambles to generate PPDUs for transmission via a physical layer device such as the transceivers (RX/TX) 1020 and 1040.

Figure 1A:
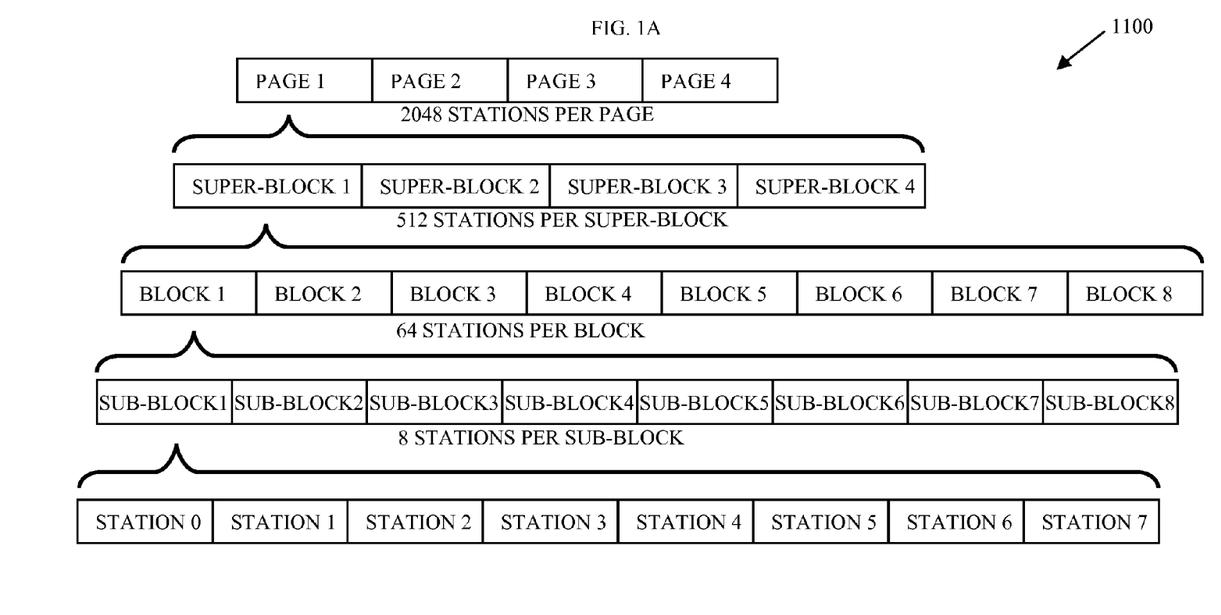
FIG. 1A depicts an embodiment of a hierarchical data structure for traffic indication mapping.
Figure 1B:
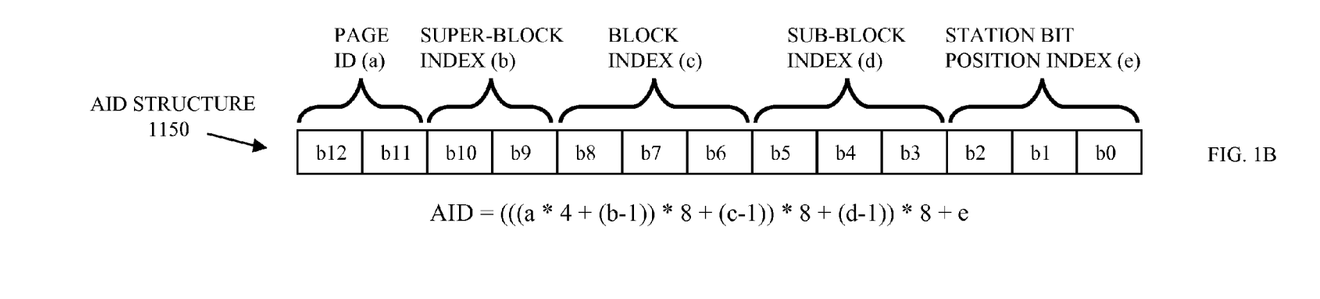
FIG. 1B depicts an embodiment of an association identifier structure for the hierarchical data structure illustrated in FIG. 1A.
Figure 1C:
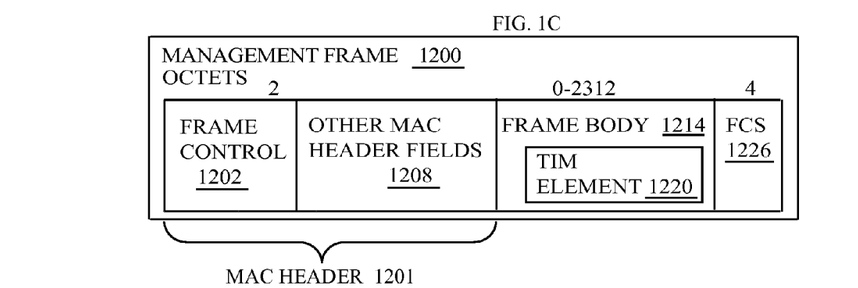
FIG. 1C depicts an embodiment of a management frame with a traffic indication map element for establishing communications between wireless communication devices.

The frame with the TIM element 1014 may comprise a frame such as the management frame 1200 in FIG. 1C. In particular, the frame with the TIM element 1014 may comprise a partial virtual bitmap based upon a hierarchical data structure such as the partial virtual bitmap 1700 illustrated in FIG. 1E and may identify each station within, e.g., one page, that has data buffered by an AP such as communications device 1010. For example, the AP may not arbitrarily transmit MSDUs to stations operating in a power saving (PS) mode, but may buffer the MSDUs and only transmit the MSDUs at designated times. Furthermore, the stations that currently have buffered MSDUs within the AP may be identified in frame comprising a TIM element, which may be included, e.g., as an element within beacon frames generated by the AP. Then, each station may determine that an MSDU is buffered for the station (such as communications device 1030) by receiving and interpreting the TIM element in the beacon frame. The station may interpret the TIM element by determining whether the page including their AID is included in the TIM element, determining whether the super-block including their AID is included in the element, determining whether the block with their AID is included in the TIM element, determining whether the sub-block with their AID is included in the TIM element, and, if so, determining whether the bit associated with their AID indicates that data is being buffered at the AP. In a base service set (BSS) operating under a distributed coordination function (DCF), upon determining that an MSDU is currently buffered in the AP, a station operating in the PS mode may transmit a PS-Poll frame to the AP, which may respond with the corresponding buffered MSDU immediately, or acknowledge the PS-Poll and respond with the corresponding MSDU at a later time.

The communications devices 1010, 1030, 1050, and 1055 may each comprise a transceiver such as transceivers 1020 and 1040. Each transceiver 1020, 1040 comprises an RF transmitter and an RF receiver. Each RF transmitter impresses digital data onto an RF frequency for transmission of the data by electromagnetic radiation. An RF receiver receives electromagnetic energy at an RF frequency and extracts the digital data therefrom.

FIG. 1 may depict a number of different embodiments including a Multiple-Input, Multiple-Output (MIMO) system with, e.g., four spatial streams, and may depict degenerate systems in which one or more of the communications devices 1010, 1030, 1050, and 1055 comprise a receiver and/or a transmitter with a single antenna including a Single-Input, Single Output (SISO) system, a Single-Input, Multiple Output (SIMO) system, and a Multiple-Input, Single Output (MISO) system.

In many embodiments, transceivers 1020 and 1040 implement orthogonal frequency-division multiplexing (OFDM). OFDM is a method of encoding digital data on multiple carrier frequencies. OFDM is a frequency-division multiplexing scheme used as a digital multi-carrier modulation method. A large number of closely spaced orthogonal sub-carrier signals are used to carry data. The data is divided into several parallel data streams or channels, one for each sub-carrier. Each sub-carrier is modulated with a modulation scheme at a low symbol rate, maintaining total data rates similar to conventional single-carrier modulation schemes in the same bandwidth.

An OFDM system uses several carriers, or "tones," for functions including data, pilot, guard, and nulling. Data tones are used to transfer information between the transmitter and receiver via one of the channels. Pilot tones are used to maintain the channels, and may provide information about time/frequency and channel tracking. Guard tones may be inserted between symbols such as the short training field (STF) and long training field (LTF) symbols during transmission to avoid inter-symbol interference (ISI), which might result from multi-path distortion. These guard tones also help the signal conform to a spectral mask. The nulling of the direct component (DC) may be used to simplify direct conversion receiver designs.

In some embodiments, the communications device 1010 optionally comprises a Digital Beam Former (DBF) 1022, as indicated by the dashed lines. The DBF 1022 transforms information signals into signals to be applied to elements of an antenna array 1024. The antenna array 1024 is an array of individual, separately excitable antenna elements. The signals applied to the elements of the antenna array 1024 cause the antenna array 1024 to radiate one to four spatial channels. Each spatial channel so formed may carry information to one or more of the communications devices 1030, 1050, and 1055. Similarly, the communications device 1030 comprises a transceiver 1040 to receive and transmit signals from and to the communications device 1010. The transceiver 1040 may comprise an antenna array 1044 and, optionally, a DBF 1042.

FIG. 1A depicts an embodiment of a hierarchical data structure 1100 for traffic indication mapping. On the top level of the hierarchy, the traffic indication virtual map may be divided into four pages. Each page may support up to 2048 stations and, in several embodiments, each page may be transmitted as a separate TIM element. In some embodiments, multiple TIM elements may be transmitted in the same medium access control (MAC) service data unit (MSDU). In further embodiments, multiple MSDUs may be aggregated in each physical layer (PHY) protocol data units (PPDUs). In other embodiments, the hierarchical data structure 1100 may comprise more or less than four pages.

Each page may comprise four super-blocks and each of the four super-blocks may support up to 512 of the stations associated with the corresponding page. In further embodiments, each super-block may comprise more or less than four super-blocks.

Each super-block may comprise eight blocks and each of the eight blocks may support up to 64 of the stations associated with the corresponding super-block. In further embodiments, each super-block may comprise more or less than eight blocks.

Each block may comprise eight sub-blocks. Each sub-block may be one octet in length and may support eight of the stations associated with the corresponding block. In further embodiments, each block may comprise more or less than eight sub-blocks and each of the sub-blocks may be more or less than one octet in length.

Each bit of a sub-block may correspond to a different association identifier (AID) and thus, each bit may uniquely identify a station. In the present embodiment, the bit may be set to 1 if there is data buffered at the AP. Otherwise, the bit may be cleared to 0.

FIG. 1B depicts an embodiment of an association identifier structure 1150 for the hierarchical data structure illustrated in FIG. 1A. In the present embodiment, the AID comprises 13 bits. In other embodiments, the AID structure 1150 may comprise more or less than 13 bits.

In the present embodiment, the AID structure 1150 may comprise a page identifier (ID) having two bits (b12-b11), which is represented as "a" in the AID equation depicted below the AID structure 1150. The AID structure 1150 may comprise a super-block index having two bits (b10-b9), which is represented as "b" in the AID equation. The AID structure 1150 may comprise a block index having three bits (b8-b6), which is represented as "c" in the AID equation. The AID structure 1150 may comprise a sub-block index having three bits (b5-b3), which is represented as "d" in the AID equation. And, the AID structure 1150 may comprise a station bit position index having three bits (b2-b0), which is represented as "e" in the AID equation.

The AID equation may describe the calculation of a unique number per station based upon the hierarchical data structure illustrated in FIG. 1A. In particular, the AID unique number in this embodiment may be calculated by the following formula:

$$AID=((((\text{Page ID}\times 4+(\text{Super-block index}-1))\times 8+ (\text{Block index}-1))\times 8+(\text{Sub-block index}-1))\times 8+ (\text{station bit position index})$$

Figure 1D:
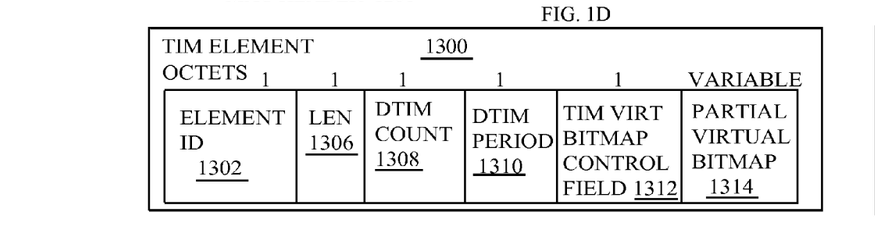
FIG. 1D depicts an embodiment of a traffic indication map element for establishing communications between wireless communication devices.
Figure 1E:
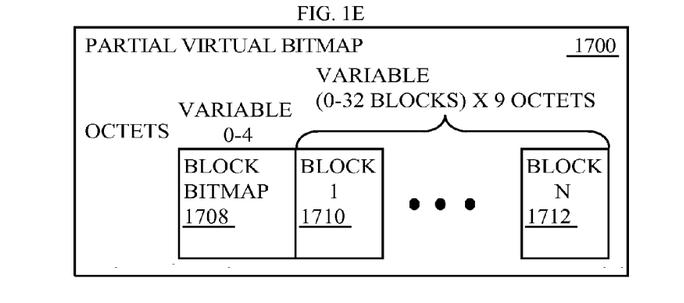
FIG. 1E depicts an embodiment of partial virtual bitmap based upon a hierarchical data structure for traffic indication mapping such as the hierarchical data structure illustrated in FIG. 1A.

To illustrate, refer to FIG. 1E at super-block 1, block 2, sub-block 6, and station 4. The variables are: the Page ID=0, the super-block index=1, the block index=2, the sub-block index=6. As a result, the equation becomes:

$$AID=(((((0\times 4+(1-1))\times 8+(2-1))\times 8+(6-1))\times 8+(4)=108$$

FIG. 1C depicts an embodiment of a management frame 1200 for communications between wireless communication devices such as communications devices 1010, 1030, 1050, and 1055 in FIG. 1. The management frame 1200 may comprise a MAC header 1201, a frame body 1214, and a frame check sequence (FCS) field 1226. The MAC header 1201 may comprise the frame control field 1202 and other MAC header fields 1208. The frame control field 1202 may be two octets and may identify the type and subtype of the frame such as a management type and, e.g., a beacon frame subtype. The other MAC header fields 1208 may comprise, for example, one or more address fields, identification fields, control fields, or the like.

In some embodiments, the management frame 1200 may comprise a frame body 1214. The frame body 1214 may be a variable number of octets and may include data elements, control elements, or parameters and capabilities. In the present embodiment, the frame body 1214 comprises a traffic indication map (TIM) element 1220.

FIG. 1D illustrates an embodiment of a TIM element 1300. An access point (AP) may transmit the TIM element 1300 to inform stations such as low power sensors that the AP is buffering data for the station. In many embodiments, the station may then initiate communications with the AP to obtain the buffered data such as via a poll frame. In other embodiments, the AP may transmit the data to the station after transmitting the beacon.

The TIM element 1300 may comprise fields such as an element identifier (ID) field 1302, a length field 1306, a delivery TIM (DTIM) count field 1308, a DTIM period field 1310, a TIM virtual bitmap control field 1312, and partial virtual bitmap 1314. The element ID field 1302 may be one octet and may identify the element as a TIM element 1300. The length field 1306 may be one octet and may define the length of the TIM element 1300 or the length of a portion thereof. The DTIM count 1308 may be one octet and may indicate how many beacon frames (including the current frame) appear before the next DTIM frame. A DTIM Count field 1308 value of 0 may indicate that the current TIM frame is a DTIM frame. For instance, immediately after every DTIM (beacon frame with DTIM Count field 1308 of the TIM element 1300 equal to zero), the AP shall transmit all buffered, group-addressed frames. If the TIM indicating the buffered MSDU or aggregate MSDU (A-MSDU) is sent during a contention-free period (CFP), a contention-free (CF)-Pollable station operating in the power-savings (PS) mode does not send a power-saving (PS)-Poll frame, but remains active until the buffered MSDU or A-MSDU is received (or the CFP ends). If any station in its base service set (BSS) is in PS mode, the AP may buffer all group-addressed MSDUs and deliver them to all stations immediately following the next beacon frame containing a DTIM transmission.

The DTIM period field 1310 may be one octet and may indicate the number of beacon intervals between successive DTIMs. In many embodiments, if all TIM frames are DTIMs, the DTIM period field 1310 may have the value 1.

The TIM virtual bitmap control field 1312 may be one octet and may describe the content of the partial virtual bitmap 1314. For instance, the TIM virtual bitmap may include a bit such as bit 0 that contains a traffic indicator bit associated with AID 0. This bit may be set to 1 in TIM elements 1300 with a value of 0 in the DTIM Count field 1308 when one or more group-addressed frames are buffered at the AP. In some embodiments, the TIM virtual bitmap control field 1312 may include an inversion bit to invert the indications of data buffered in the partial virtual bitmap such as in super-blocks, blocks, and sub-blocks, to include indications that data is not buffered for such stations.

Figure 1F:
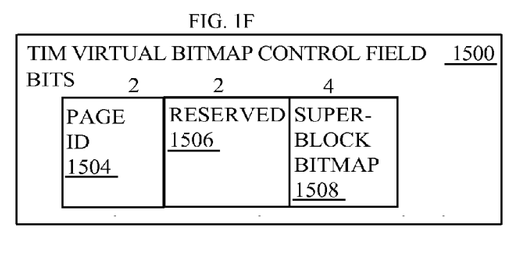
FIG. 1F depicts an embodiment of a traffic indication map, virtual bitmap control field such as the traffic indication map, virtual bitmap control field illustrated in FIG. 1D.

An embodiment of a TIM virtual partial bitmap control field 1500 is depicted in FIG. 1F. The TIM virtual partial bitmap control field 1500 may comprise a page identifier (ID) field 1504, a reserved field 1506, and a super-block bitmap field 1508. The page ID field 1504 may be 2 bits in length and may indicate the page index of 0 through 3 (binary bits 00, 01, 10, and 11, respectively) to represent four pages. The reserved field 1506 may be two bits and may be used for different functions. One such function may comprise extending the present embodiment to include more than four pages. For instance, the reserved field 1506 may extend the page ID field 1506 to describe eight or 16 pages rather than four pages.

The super-block bitmap field 1508 may be four bits in length and may indicate which super-block is present in the following partial virtual bitmap 1314 in a block bitmap field such as a block bitmap field 1708 illustrated in FIG. 1E. The four bits in the super-block bitmap field 1508 may correspond to four super-blocks. If the n-th bit in the field is set to 1, then the n-th super-block may be present in the block bitmap field 1708. Otherwise, the n-th super-block may not be present in the block bitmap field 1708. Looking to the embodiment 1800 illustrated in FIG. 1H, only the first two super-blocks (super-blocks 1 and 2) will be present in the partial virtual bitmap 1700 because the values associated with super-blocks 1 and 2 are ones and the values associated with super-blocks 3 and 4 are zeros, "1100", in the super-block bitmap field. Therefore, for this embodiment, the super-block bitmap 1508 is encoded as "1100" and the block bitmap field 1708 will be two octets in length. In other situations, the super-block bitmap field 1508 may be encoded as "1110" and the block bitmap field 1708 will be three octets in length or the super-block bitmap field 1508 may be encoded as "1111" and the block bitmap field 1708 will be four octets in length.

Referring again to FIG. 1D, the partial virtual bitmap field 1314 may comprise bits describing stations for which data is buffered by the AP based upon a hierarchical data structure such as the hierarchical data structure illustrated in FIG. 1A. FIG. 1E depicts an embodiment of a partial virtual bitmap field 1700. The partial virtual bitmap 1700 may comprise the block bitmap field 1708 and a variable number of blocks from block 1 1710 to block N 1712.

In the present embodiment, the block bitmap field 1708, if present, is variable in length (1 to 4 octets) depending on the encoding of super-block bitmap such as the super-block bitmap field 1508 in FIG. 1F. If the super-block bitmap field 1508 value is 0000, then the block bitmap field 1708 is not present. The block bitmap field 1708 may indicate which blocks (1 through N) are present in the following block fields 1710 through 1712. The m-th bit in the block bitmap field 1708 indicates the m-th block. If the m-th bit is set to 1, the m-th block is present in the following block fields 1710 through 1712. If the m-th bit is set to 0, the m-th block is not present in the following block fields 1710 through 1712.

Figure 1G:
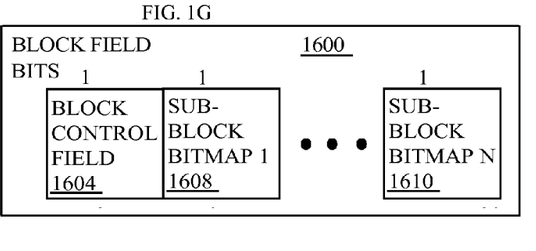
FIG. 1G depicts an embodiment of a block field such as the block fields illustrated in FIG. 1E.
Figure 1H:
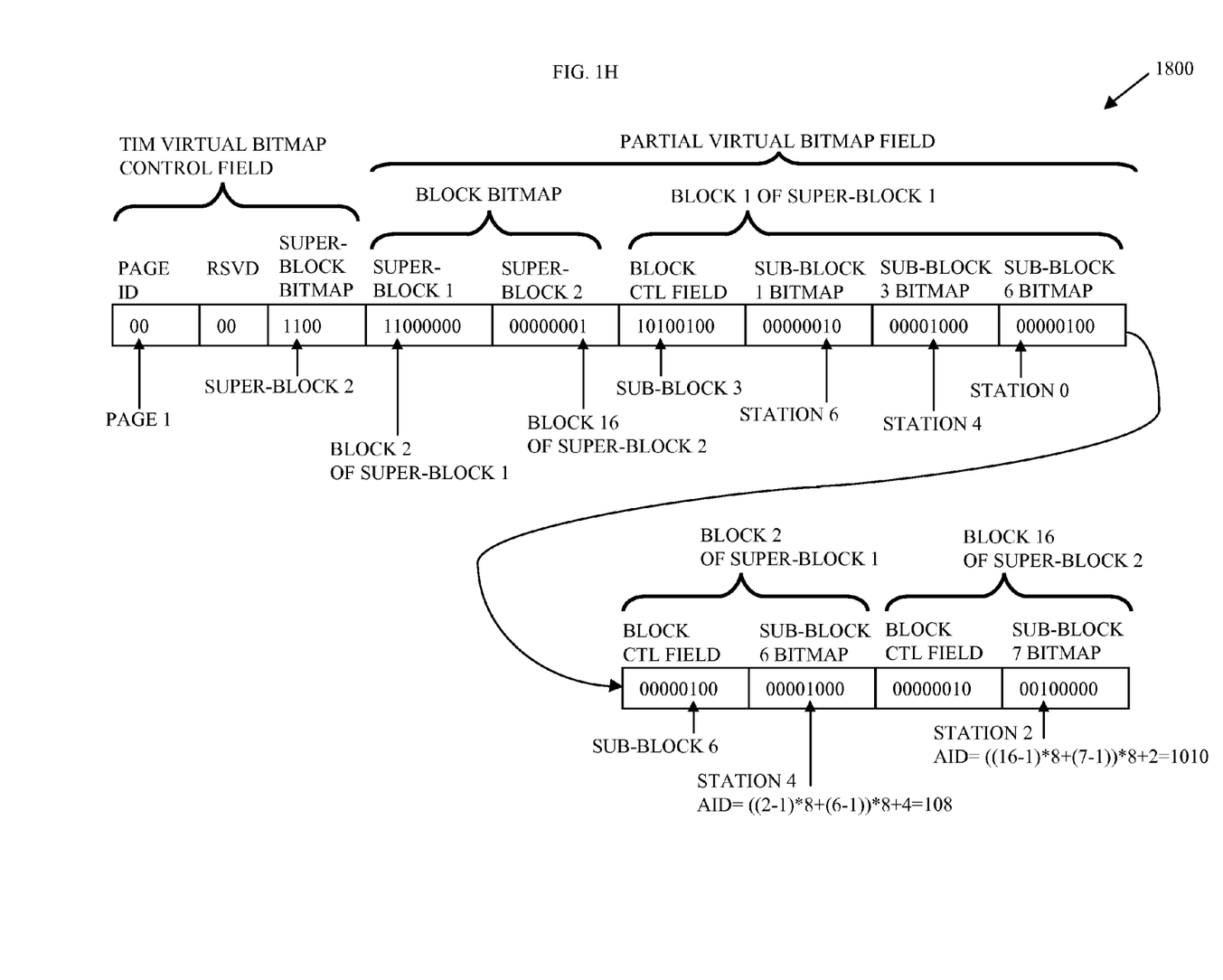
FIG. 1H depicts an embodiment of partial virtual bitmap based upon a hierarchical data structure for traffic indication mapping such as the hierarchical data structure illustrated in FIG. 1A with example values in each field.

To illustrate, refer to the embodiment 1800 in FIG. 1H. In the embodiment 1800, the block bitmap 1708 only comprises non-zero values for block 1, block 2, and block 16 and the other blocks are all zeros so the encoded value of the block bitmap field 1708 is "1100 0000 0000 0001" and is two octets in length. Furthermore, there will be three block fields (block 1, block 2, and block 16) following the block bitmap field 1708 in the embodiment 1800.

According to an embodiment, to further improve the efficiency, one bit of the reserved field 1506 can be used as a block bitmap control bit to indicate whether the block bitmap field 1708 is present or not following the super-block bitmap field 1508. If all the blocks are present, the block bitmap field 1708 can be removed since all the bits will be set to ones. Therefore, if the block bitmap control bit is set to 1, the block bitmap field 1708 is not present but all the blocks 1 through N are present. If the block bitmap control bit is cleared to 0, the block bitmap field 1708 is present.

In other embodiments, one or more bits of, e.g., the block bitmap field 1708 and/or the reserved field 1506 may indicate that values of bits for stations having buffered data at the AP have been inversed. In many such embodiments, the inversion process may increase the efficiency of the TIM element 1300 by reducing the amount of data to transmit to a receiving station to communicate the TIM element.

Each block field such as block fields 1 1710 through N 1712, if present, may comprise a variable in length of, e.g., 1 to 9 octets and may comprise a block control field and sub-block bitmap fields 1 1608 through N 1610.

Referring now to FIG. 1G, there is shown an embodiment of a block field 1600 such as the block field 1 1710 through block field N 1712 illustrated in the partial virtual bitmap field 1700. The block field 1600 comprises a block control field 1604 and possibly sub-block bitmap 1 1608 through sub-block bitmap N 1610.

The block control field 1604 may be one octet in length and each bit indicates which sub-block is present in the following sub-block bitmaps 1 1608 through sub-block bitmap N 1610, each also being one octet in length. If the 1-th bit in the block control field 1604 is set to 1, the 1-th sub-block bitmap is present in the following sub-block bitmaps. If the 1-th bit in the block control field 1604 is set to 0, the 1-th sub-block bitmap is not present in the following sub-block bitmaps. Looking at the embodiment 1800 shown in FIG. 1H, for block 1 of super-block 1, the block control field 1604 is encoded as "10100100" and is followed by three sub-blocks, sub-block 1, sub-block 3, and sub-block 6. Similarly, for block 2 of super-block 1, the block control field is encoded as "00000100" and is followed by sub-block 6 and for block 16 of super-block 2, the block control field is encoded as "00000010" and is followed by sub-block 7.

Note that sub-block 7 indicates that one station, station 2 having an AID equal to 1010, is the only station for which the AP is buffering or maintaining data. In other embodiments, the block control field for block 16 of super-block 2 may include a bit to indicate that the bits of sub-block 7 are inverted such that logical ones indicate that the AP is not buffering data for the stations and logical zeros indicate that the AP is buffering data for the stations.

The inversion process may be applied for each block if, e.g., there are more all-one values sub-blocks than all-zero values sub-blocks. In some embodiments, the first bit, b0, of the block control field such as block control field 1604 may be repurposed to be an inverse bit to indicate whether the following sub-block bitmap fields are inversed or not. In the present embodiment, if the bit is set to 1, the sub-blocks are inversed. After inversion, only the sub-blocks with non-zero values are encoded in the corresponding block field. The bits, [b1 . . . b7] of the block control field 1604 may be used to indicate whether sub-blocks are present or not in the block field. In such embodiments, if bit b0 is defined as an inverse bit, the number of sub-blocks may be limited to seven and this may reduce the number stations that are supported by one page (page ID) to four super-blocks by eight blocks by seven sub-blocks by eight stations, which may equal 1792. In other embodiments, a different bit may be defined for use as an inverse bit.

In the present embodiment, when the inverse bit is set to 1, the following bits [b1 . . . b7] in the block control field are interpreted such that if bi is 0, insert i-th sub-block with the all-zero value. On the other hand, if bi is 1, use the received sub-block for reconstructing the block field and then inverse the reconstructed block field.

Referring again to FIG. 1G, the sub-block bitmap fields 1 1608 through N 1610, if present, may be variable in length, e.g., 1 to 8 octets, depending on the value of the block control field 1604. Each bit corresponds to an AID of a station. If the p-th bit of a sub-block bitmap field is set to 1, it indicates that there is data buffered for the corresponding station. Referring again to the embodiment 1800 in FIG. 1H, the sub-block 1 bitmap [b0 . . . b7] is encoded as "00000010" by setting the 6-th bit to 1. Setting the 6-th bit to 1 indicates that there is data buffered at the AP for the station 6. The sub-block 3 bitmap [b0 . . . b7] is encoded as "00001000".

Referring again to FIG. 1C, in many embodiments, the management frame 1200 may comprise a frame check sequence (FCS) field 1226. The FCS field 1226 may be four octets and may include extra checksum characters added to the short frame 1060 for error detection and correction.

Note that the values shown in the FIGS. 1A-1H are for illustrative purposes and may be other values in other embodiments.

Figure 2:
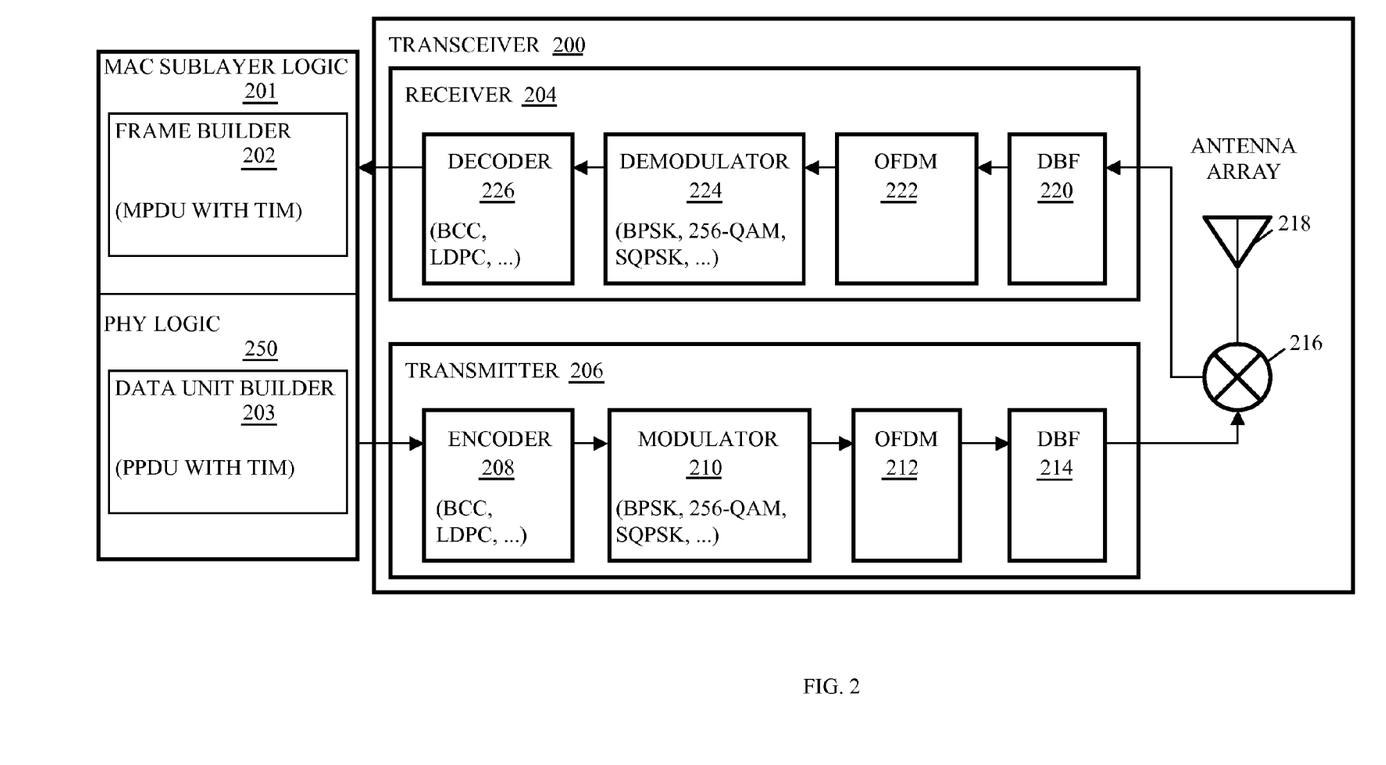
FIG. 2 depicts an embodiment of an apparatus to generate, transmit, receive and interpret a frame with a partial virtual bitmap based upon a hierarchical data structure for traffic indication mapping.

FIG. 2 depicts an embodiment of an apparatus to generate, transmit, receive, and interpret or decode a traffic indication map (TIM) element in a frame. The apparatus comprises a transceiver 200 coupled with Medium Access Control (MAC) sublayer logic 201 and a physical layer (PHY) logic 250. The MAC sublayer logic 201 may determine a frame and the physical layer (PHY) logic 250 may determine the PPDU by encapsulating the frame or multiple frames, MAC protocol data units (MPDUs), with a preamble to transmit via transceiver 200.

In many embodiments, the MAC sublayer logic 201 may comprise a frame builder 202 to generate frames such as one of the management frame 1200 with TIM elements 1220 or 1300 illustrated in FIGS. 1A-H. The TIM elements may comprise data indicative of MAC service data units (MSDUs) buffered or stored by an associated access point (AP) for particular stations associated with the AP. Association identifiers (AIDs) may identify the stations. The AP such as the communications device 1010 and a station such as the communications device 1030 in FIG. 1 may maintain some or part of the TIM elements 1220 or 1300 and values in memory such as the memory 1012 and 1032 illustrated in FIG. 1.

The PHY logic 250 may comprise a data unit builder 203. The data unit builder 203 may determine a preamble to encapsulate the MPDU or more than one MPDUs to generate a PPDU. In many embodiments, the data unit builder 203 may create the preamble based upon communications parameters chosen through interaction with a destination communications device.

The transceiver 200 comprises a receiver 204 and a transmitter 206. The transmitter 206 may comprise one or more of an encoder 208, a modulator 210, an OFDM 212, and a DBF 214. The encoder 208 of transmitter 206 receives and encodes data destined for transmission from the MAC sublayer logic 202 with, e.g., a binary convolutional coding (BCC), a low density parity check coding (LDPC), and/or the like. The modulator 210 may receive data from encoder 208 and may impress the received data blocks onto a sinusoid of a selected frequency via, e.g., mapping the data blocks into a corresponding set of discrete amplitudes of the sinusoid, or a set of discrete phases of the sinusoid, or a set of discrete frequency shifts relative to the frequency of the sinusoid. The output of modulator 210 is fed to an orthogonal frequency division multiplexer (OFDM) 212, which impresses the modulated data from modulator 210 onto a plurality of orthogonal sub-carriers. And, the output of the OFDM 212 may be fed to the digital beam former (DBF) 214 to form a plurality of spatial channels and steer each spatial channel independently to maximize the signal power transmitted to and received from each of a plurality of user terminals.

The transceiver 200 may also comprise diplexers 216 connected to antenna array 218. Thus, in this embodiment, a single antenna array is used for both transmission and reception. When transmitting, the signal passes through diplexers 216 and drives the antenna with the up-converted information-bearing signal. During transmission, the diplexers 216 prevent the signals to be transmitted from entering receiver 204. When receiving, information bearing signals received by the antenna array pass through diplexers 216 to deliver the signal from the antenna array to receiver 204. The diplexers 216 then prevent the received signals from entering transmitter 206. Thus, diplexers 216 operate as switches to alternately connect the antenna array elements to the receiver 204 and the transmitter 206.

The antenna array 218 radiates the information bearing signals into a time-varying, spatial distribution of electromagnetic energy that can be received by an antenna of a receiver. The receiver can then extract the information of the received signal.

The transceiver 200 may comprise a receiver 204 for receiving, demodulating, and decoding information bearing signals. The receiver 204 may comprise one or more of a DBF 220, an OFDM 222, a demodulator 224 and a decoder 226. The received signals are fed from antenna elements 218 to a Digital Beam Former (DBF) 220. The DBF 220 transforms N antenna signals into L information signals. The output of the DBF 220 is fed to the OFDM 222. The OFDM 222 extracts signal information from the plurality of sub-carriers onto which information-bearing signals are modulated. The demodulator 224 demodulates the received signal, extracting information content from the received signal to produce an un-demodulated information signal. And, the decoder 226 decodes the received data from the demodulator 224 and transmits the decoded information, the MPDU or more than one MPDUs, to the MAC sublayer logic 201.

Persons of skill in the art will recognize that a transceiver may comprise numerous additional functions not shown in FIG. 2 and that the receiver 204 and transmitter 206 can be distinct devices rather than being packaged as one transceiver. For instance, embodiments of a transceiver may comprise a Dynamic Random Access Memory (DRAM), a reference oscillator, filtering circuitry, synchronization circuitry, an interleaver and a deinterleaver, possibly multiple frequency conversion stages and multiple amplification stages, etc. Further, some of the functions shown in FIG. 2 may be integrated. For example, digital beam forming may be integrated with orthogonal frequency division multiplexing.

The MAC sublayer logic 201 may decode or parse the MPDU or MPDUs to determine the particular type of frame or frames and identify one or more TIM elements included in the MPDU(s). For each TIM element, the MAC sublayer logic 201 may parse the TIM element to determine the page ID from the TIM element. If the page ID matches the page ID for the MAC sublayer logic 201 then the TIM element may comprise data related to the receiving station associated with the MAC sublayer logic 201. The MAC sublayer logic 201 may parse the TIM element to determine the super block, the block, the sub-block, and the station within the sub-block, if present, that is associated with the AID for the receiving station from the TIM element. If a bit associated with the receiving station is not present or is a logical zero, then the receiving station may not have data buffered at the AP. On the other hand, if the bit associated with the receiving station is present and is a logical one, the receiving station may have data buffered at the AP.

In other embodiments, if an inverse bit is set in the TIM element, the page ID may refer to the page or pages of the TIM that do not have data buffered, the super-blocks may refer to super-blocks that do not have data buffered, the blocks may refer to blocks that do not have data buffered, the sub-blocks may refer to sub-blocks that do not have data buffered, or the bits associated with the AID of the receiving station may comprise a logical zero to indicate that data is buffered for the receiving station at the AP and a logical one to indicate that data is not buffered at the AP.

Figure 3:
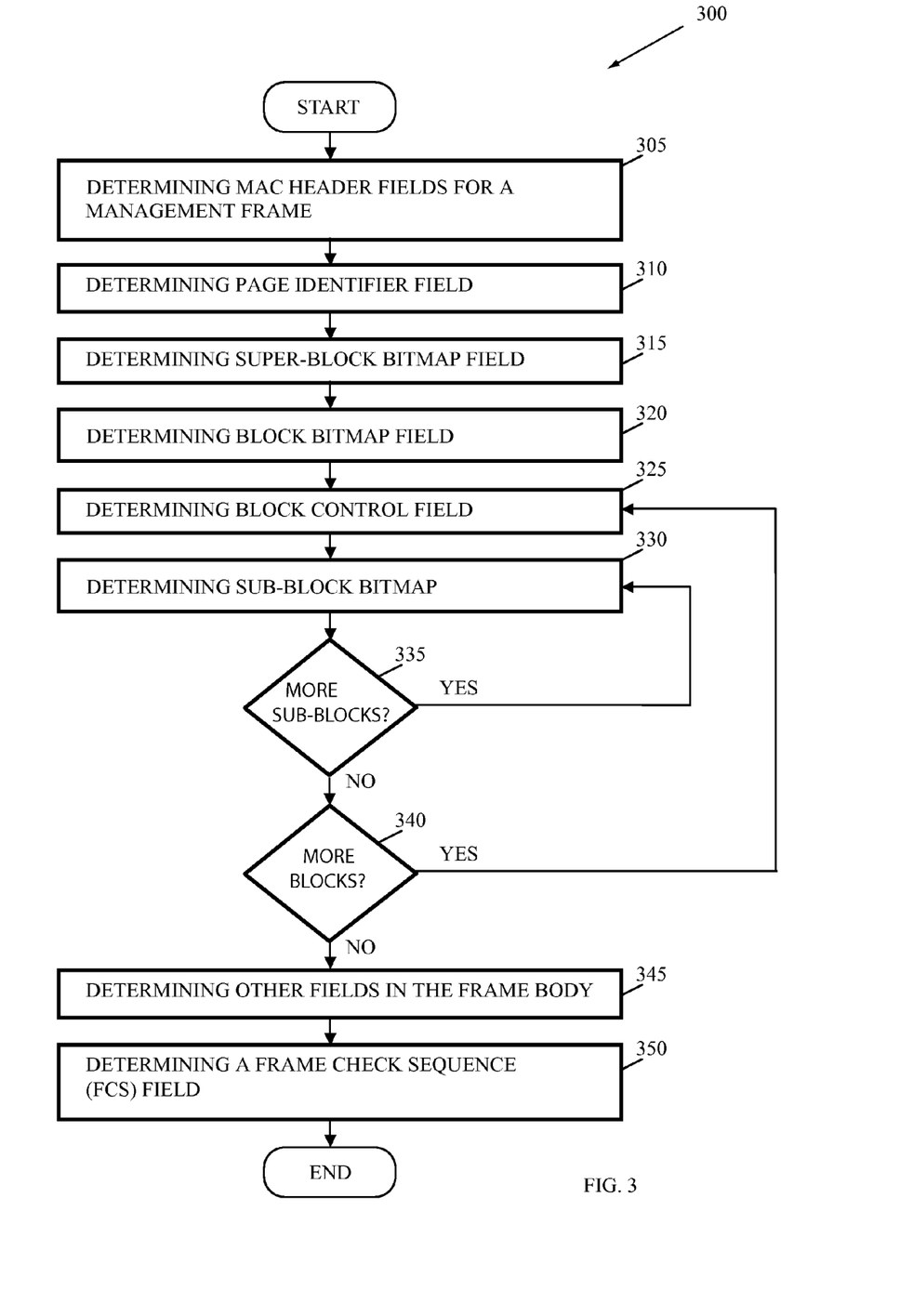
FIG. 3 depicts an embodiment of a flowchart to generate a frame with a partial virtual bitmap based upon a hierarchical data structure for traffic indication mapping.

FIG. 3 depicts an embodiment of a flowchart 300 to generate or otherwise determine a management frame with a TIM element such as the TIM elements described in conjunction with FIGS. 1-2. The flowchart 300 begins with a medium access control (MAC) sublayer logic determining a MAC header for a management frame (element 305).

The MAC sublayer logic may thereafter determine the TIM element for the frame body. Determining the TIM element may comprise determining a page identifier field to identify the page of association identifiers (AIDs) for which the TIM element comprises information about data buffered for stations (element 310). For instance, the MAC sublayer logic may access memory to retrieve an element structure for the TIM elements and assign the elements values such as a logical one to indicate that devices have data buffered at the access point (AP) within which the MAC sublayer logic resides.

The MAC sublayer logic may determine a super-block bitmap field (element 315). The super-block bitmap field may identify one or more super-blocks comprising (AIDs) that indicate the AP buffers data. The MAC sublayer logic may determine a block bitmap field (element 320). The block bitmap field may be present for each of the super-blocks that indicate that the AP buffers data for associated stations. If, however, an inverse bit is defined and set, the block bitmap field may be present for each of the super-blocks that indicate that the AP does not buffer data for associated stations.

The MAC sublayer logic may determine a block control field (element 325). The block control field may be present for each of the blocks that indicate that the AP buffers data for associated stations. If, however, an inverse bit is defined and set, the block control field may be present for each of the blocks that indicate that the AP does not buffer data for associated stations.

The MAC sublayer logic may determine a sub-block bitmap field (element 330). The sub-block bitmap field may be present for each of the sub-blocks that indicate that the AP buffers data for associated stations. If, however, an inverse bit is defined and set, the sub-block bitmap field may be present for each of the sub-blocks that indicate that the AP does not buffer data for associated stations.

If additional sub-blocks associated with the last block control field indicate that the AP buffers data for associated stations (element 335), the flowchart 300 continues by repeating element 330. Otherwise, if more blocks associated with the super-blocks indicate that that the AP buffers data for associated stations, the flowchart 300 continues with element 325 by determining another block control field.

Otherwise, the MAC sublayer logic may determine other elements of the management frame body frame (element 345). In many embodiments, determining the fields may comprise retrieving these fields from a storage medium for inclusion in a frame. In other embodiments, the values to include in such fields may be stored in a storage medium such as a read only memory, random access memory, a cache, a buffer, a register, or the like. In further embodiments, one or more of the fields may be hardcoded into the MAC sublayer logic, PHY logic, or may otherwise be available for insertion into a frame. In still other embodiments, the MAC sublayer logic may generate the values of the fields based upon access to indications of the values for each.

After determining the other portions of the frame, the MAC sublayer logic may determine a frame check sequence (FCS) field value (element 350) to provide for error corrections in bit sequences received by the receiving device.

Figure 4A:
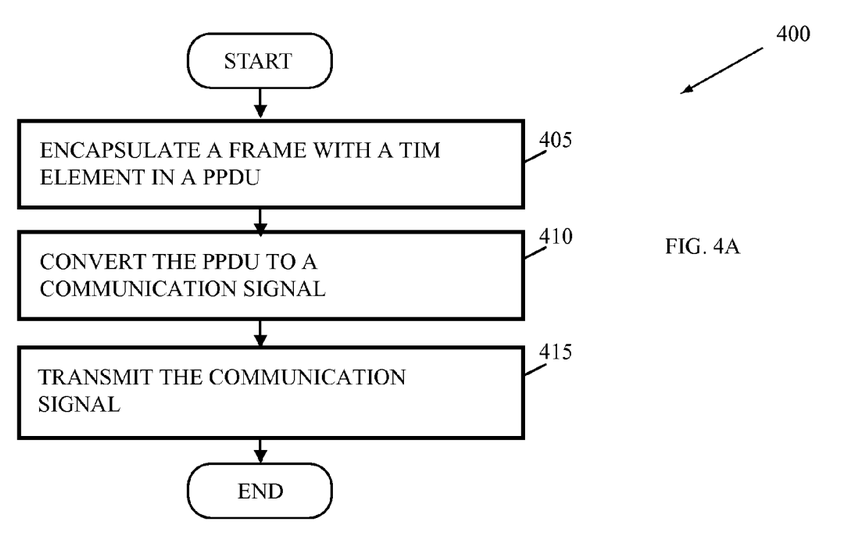
FIGS. 4A-B depict embodiments of flowcharts to transmit, receive, and interpret communications with frames having partial virtual bitmaps based upon a hierarchical data structure for traffic indication mapping as illustrated in FIG. 2.
Figure 4B:
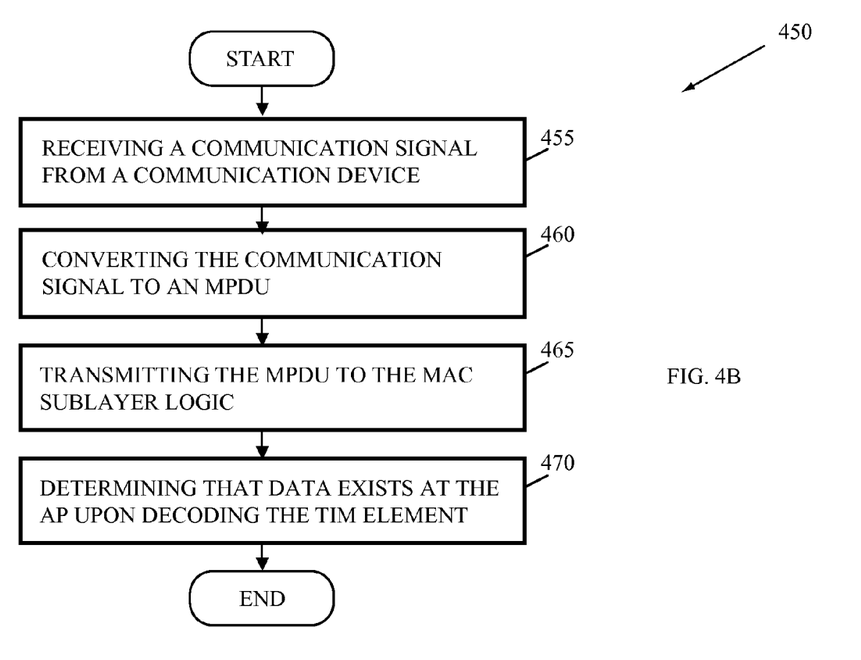

FIGS. 4A-B depict embodiments of flowcharts 400 and 450 to transmit, receive, and interpret or decode communications with a management frame with a TIM element such as the TIM elements illustrated in FIGS. 1A-H. Referring to FIG. 4A, the flowchart 400 may begin with receiving a frame from the frame builder comprising one or more TIM elements. The MAC sublayer logic of the communications device may generate the frame as a management frame to transmit to a station and may pass the frame as an MPDU to a data unit builder that transforms the data into a packet that can be transmitted to a station. The data unit builder may generate a preamble to encapsulate one or more of the MPDUs from the frame builder to form a PPDU for transmission (element 405).

The PPDU may then be transmitted to the physical layer device such as the transmitter 206 in FIG. 2 or the transceiver 1020,1040 in FIG. 1 so the PPDU may be converted to a communication signal (element 410). The transmitter may then transmit the communication signal via the antenna (element 415).

Referring to FIG. 4B, the flowchart 450 begins with a receiver of a station such as the receiver 204 in FIG. 2 receiving a communication signal via one or more antenna(s) such as an antenna element of antenna array 218 (element 455). The receiver may convert the communication signal into one or more MPDUs in accordance with the process described in the preamble (element 460). More specifically, the received signal is fed from the one or more antennas to a DBF such as the DBF 220. The DBF transforms the antenna signals into information signals. The output of the DBF is fed to OFDM such as the OFDM 222. The OFDM extracts signal information from the plurality of subcarriers onto which information-bearing signals are modulated. Then, the demodulator such as the demodulator 224 demodulates the signal information via, e.g., BPSK, 16-QAM, 64-QAM, 256-QAM, QPSK, or SQPSK. And the decoder such as the decoder 226 decodes the signal information from the demodulator via, e.g., BCC or LDPC, to extract the one or more MPDUs (element 460) and transmits the one or more MPDUs to MAC sublayer logic such as MAC sublayer logic 202 (element 465).

The MAC sublayer logic may decode the TIM element in each of the MPDUs. For instance, the MAC sublayer logic may parse the TIM element to determine the value of the page ID field, one or more super-block fields, the block bitmap field, a block control field for one or more blocks, and the sub-block bitmap fields for one or more sub-block bitmaps to determine whether the bit associated with the AID for the receiving station indicates that the AP is buffering data for the station (element 470). In some embodiments, the MAC sublayer logic may determine whether the other fields in the TIM element(s) indicate that the data will be broadcast to a group of devices after receipt of the beacon comprising the TIM element, or if the AP will await a frame from the station instructing the AP to send the frame.

Figure 5:
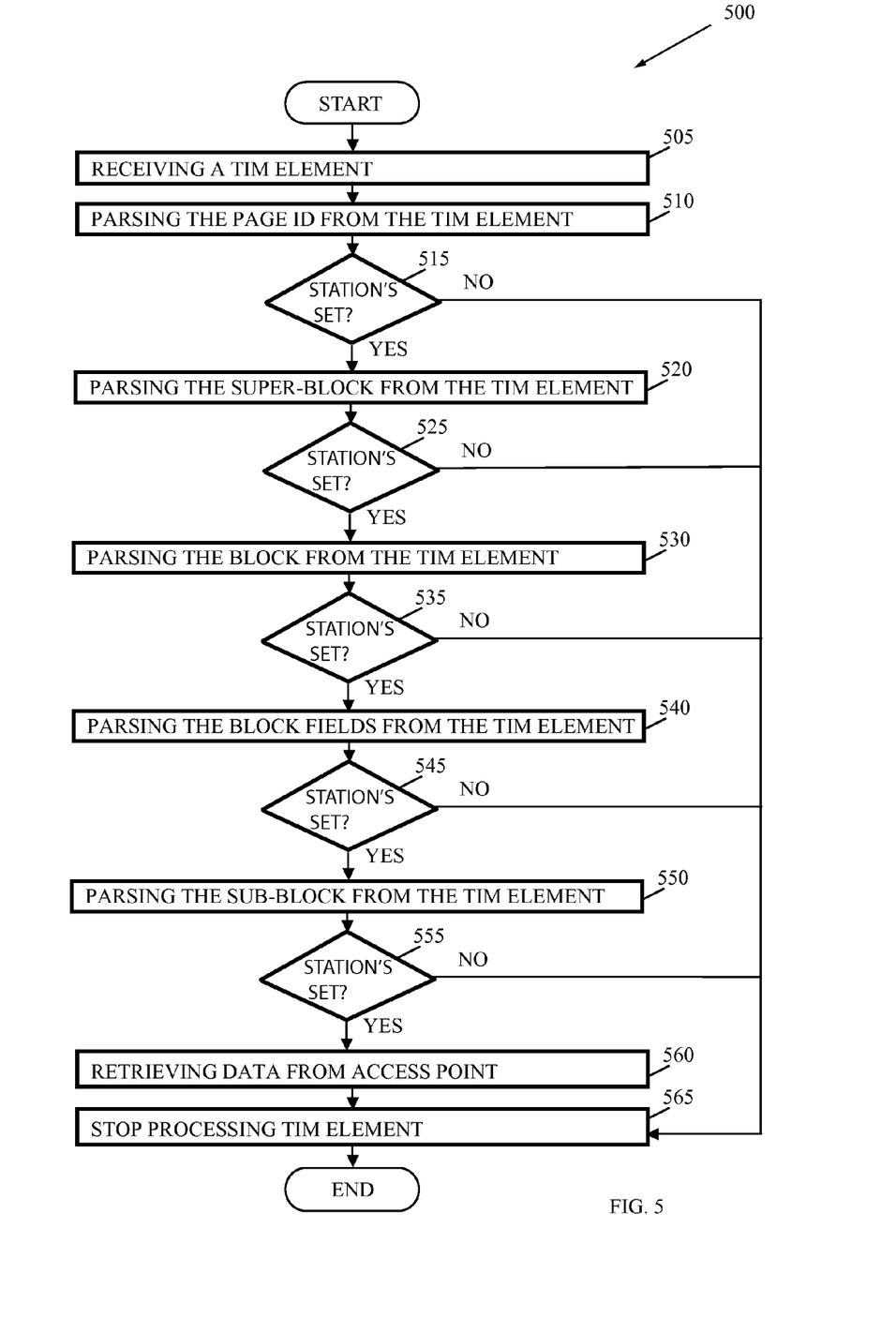
FIG. 5 depicts an embodiment of a flowchart to decode a frame with a partial virtual bitmap based upon a hierarchical data structure for traffic indication mapping.

FIG. 5 depicts an embodiment of a flowchart 500 for a receiving station to decode or otherwise determine information from a management frame with a TIM element such as the TIM elements described in conjunction with FIGS. 1-4. The flowchart 500 begins with a medium access control (MAC) sublayer logic receiving the TIM element (element 505). The MAC sublayer logic may parse the TIM element to determine a page identifier to identify the page of association identifiers (AIDs) for which the TIM element comprises information about data buffered for stations (element 510). For instance, the MAC sublayer logic may access memory to retrieve an association identifier (AID) assigned to the receiving station by the AP and parse the AID to determine the page ID associated with the receiving station. If the page ID does not match the page ID determined from the TIM element (element 515), then the receiving station may stop processing the TIM element (element 565).

If the page ID does match, the MAC sublayer logic may parse the TIM element to determine the one or more super-blocks included in the TIM element to identify the super-blocks of AIDs for which the TIM element comprises information about data buffered for stations (element 520). If the super-block associated with the receiving station does not match the super-blocks determined from the TIM element (element 525), then the receiving station may stop processing the TIM element (element 565).

If the super-block associated with the receiving station does match, the MAC sublayer logic may parse the TIM element to determine the one or more blocks included in the TIM element to identify the blocks of AIDs for which the TIM element comprises information about data buffered for stations (element 530). If the block associated with the receiving station does not match the blocks determined from the TIM element (element 535), then the receiving station may stop processing the TIM element (element 565).

If the block associated with the receiving station does match, the MAC sublayer logic may parse the TIM element to determine the one or more block fields included in the TIM element to identify the blocks of AIDs for which the TIM element comprises information about data buffered for stations (element 540). If the block associated with the receiving station does not fall within the blocks identified in the block fields determined from the TIM element (element 545), then the receiving station may stop processing the TIM element (element 565).

In some embodiments, the block fields may define an inverse bit that inverses the indication of blocks or sub-blocks included in the TIM element. If the inverse bit is defined for the embodiment and the inverse bit is set, then the MAC sublayer logic may determine whether the block within which the receiving stations AID resides is not included to determine whether the AP is buffering data for the receiving station. In such embodiments, if the block is not included, the receiving station may retrieve the data from the access point (element 560).

Otherwise, the MAC sublayer logic may parse the TIM element to determine the one or more sub-blocks included in the TIM element to identify the sub-blocks of AIDs for which the TIM element comprises information about data buffered for stations (element 530). If the sub-block associated with the receiving station does not fall within the sub-blocks identified in the sub-blocks determined from the TIM element (element 555), then the receiving station may stop processing the TIM element (element 565).

If the sub-block associated with the receiving station does fall within the sub-blocks identified in the sub-blocks determined from the TIM element (element 555), then the receiving station may retrieve the data from the access point (element 560).

Another embodiment is implemented as a program product for implementing systems and methods described with reference to FIGS. 1-5. Some embodiments can take the form of an entirely hardware embodiment, an entirely software embodiment, or an embodiment containing both hardware and software elements. One embodiment is implemented in software, which includes but is not limited to firmware, resident software, microcode, etc.

Furthermore, embodiments can take the form of a computer program product (or machine-accessible product) accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R'W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

The logic as described above may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product.

It will be apparent to those skilled in the art having the benefit of this disclosure that the present disclosure contemplates methods and arrangements for traffic indication mapping for wireless communications. It is understood that the form of the embodiments shown and described in the detailed description and the drawings are to be taken merely as examples. It is intended that the following claims be interpreted broadly to embrace all variations of the example embodiments disclosed.

What is claimed is:

1. A method comprising:
   generating, by a medium access control sublayer logic, a frame comprising a traffic indication map element based upon a hierarchical data structure, wherein the hierarchical data structure comprises more than one pages and each page comprises more than one super-blocks and each super-block comprises one or more blocks, wherein the medium access control sublayer logic assigns an association identifier to each associated station to assign a page and a super-block of the page to the associated station, wherein the traffic indication map element indicates buffered data by indicating at least the page and the super-block; and
   creating, by physical layer logic, a physical layer protocol data unit comprising the frame with a preamble.

2. The method of claim 1, wherein generating the frame comprises generating the frame wherein the traffic indication map indicates the buffered data by indicating a block, wherein the super-block comprises the block and other blocks and the block is identified by the association identifier assigned to the associated station.

3. The method of claim 2, wherein generating the frame comprises generating the frame wherein the traffic indication map indicates the buffered data by indicating a block control field, wherein the block comprises the block control field.

4. The method of claim 3, wherein generating the frame comprises generating the frame wherein the block control field comprises an inverse bit, the inverse bit being set to indicate that a sub-block field of the block comprises inverted indications of buffered data.

5. A device comprising:
   a memory;
   a medium access control sublayer logic coupled with the memory to generate a frame comprising a traffic indication map element based upon a hierarchical data structure, wherein the hierarchical data structure comprises more than one pages and each page comprises more than one super-blocks, and each super-block comprises one or more blocks, wherein the medium access control sublayer logic assigns an association identifier to each associated station to assign a page and a super-block of the page to the associated station, wherein the traffic indication map element indicates buffered data by indicating at least the page and the super-block.

6. The device of claim 5, wherein the medium access control sublayer logic is coupled with the memory to store at least a portion of the frame.

7. The device of claim 5, wherein the medium access control sublayer logic comprises logic to generate the frame with the traffic indication map to indicate the buffered data by indicating a block, wherein the super-block comprises the block and other blocks and the block is identified by the association identifier assigned to the associated station.

8. The device of claim 7, wherein the medium access control sublayer logic comprises logic to generate the frame with the traffic indication map to indicate the buffered data by indicating a block control field, wherein the block comprises the block control field.

9. The device of claim 8, wherein the medium access control sublayer logic comprises logic to generate the frame with the traffic indication map to indicate the block control field comprises an inverse bit, the inverse bit to be set to indicate that a sub-block field of the block comprises inverted indications of buffered data.

10. A method comprising:
    receiving, by a medium access control sublayer logic of an associated station, a frame comprising a traffic indication map element based upon a hierarchical data structure, wherein the hierarchical data structure comprises more than one pages and each page comprises more than one super-blocks, and each super-block comprises one or more blocks, wherein the medium access control sublayer logic received an association identifier from an access point to assign a page and a super-block of the page to the associated station; and decoding, by the medium access control sublayer logic, the traffic indication map to determine the traffic indication map element indicates buffered data by indicating at least the page and the super-block.

11. The method of claim 10, further comprising storing in memory, by the medium access control sublayer logic, the association identifier.

12. The method of claim 10, wherein decoding comprises determining that a block of the super-block indicated by the traffic indication map and identified in the association identifier indicates buffered data.

13. The method of claim 12, wherein decoding comprises determining that a block control field of the block indicated by the traffic indication map and identified in the association identifier indicates buffered data.

14. The method of claim 12, wherein decoding comprises determining that a block control field of the block indicated by the traffic indication map and identified in the association identifier comprises an inverse bit that is set to a logical one.

15. The method of claim 12, wherein decoding comprises determining that a sub-block field of the block indicated by the traffic indication map and identified in the association identifier indicates buffered data.

16. A device comprising:
a memory;
a medium access control sublayer logic coupled with the memory to receive a frame comprising a traffic indication map element based upon a hierarchical data structure, wherein the hierarchical data structure comprises more than one pages and each page comprises more than one super-blocks, and each super-block comprises one or more blocks, wherein the medium access control sublayer logic received an association identifier from an access point to assign a page and a super-block of the page to an associated station; and to decode the traffic indication map to determine the traffic indication map element indicates buffered data by indicating at least the page and the super-block.

17. The device of claim 16, further comprising a receiver coupled with the medium access control logic to receive the frame.

18. The device of claim 17, further comprising an antenna coupled with the receiver to receive the frame.

19. The device of claim 16, wherein the medium access control sublayer logic comprises logic to store in the memory, the association identifier.

20. The device of claim 16, wherein the medium access control sublayer logic comprises logic to determine that a block of the super-block indicated by the traffic indication map and identified in the association identifier indicates buffered data.

21. The device of claim 20, wherein the medium access control sublayer logic comprises logic to determine that a block control field of the block indicated by the traffic indication map and identified in the association identifier indicates buffered data.

22. The device of claim 20, wherein the medium access control sublayer logic comprises logic to determine that a block control field of the block indicated by the traffic indication map and identified in the association identifier comprises an inverse bit that is set to a logical one.

23. A non-transitory machine-accessible product comprising:
a medium containing instructions to determine an association identifier to uniquely identify a station associated with an access point, wherein the instructions, when executed by the access point, causes the access point to perform operations, the operations comprising:
determining a page identifier to associate the station with a page of association identifiers amongst more than one pages of association identifiers; and
determining a super-block index to associate the station with a super-block of association identifiers amongst more than one super-blocks of association identifiers, wherein each of the super-blocks identifies a unique subset of the association identifiers associated with the page of a hierarchical data structure, wherein the hierarchical data structure comprises the more than one pages, each page comprises more than one super-blocks, and each super-block comprises one or more blocks.

24. The non-transitory machine accessible product of claim 23, wherein the operations further comprise determining a block index to associate the station with a block of association identifiers amongst more than one blocks of association identifiers, wherein each of the blocks identifies a unique subset of the association identifiers associated with the super-block.

25. The non-transitory machine accessible product of claim 24, wherein the operations further comprise determining a sub-block index to associate the station with a sub-block of association identifiers amongst more than one sub-blocks of association identifiers, wherein each of the sub-blocks identifies a unique subset of the association identifiers associated with the block.

* * * * *